(12) United States Patent
Farrell et al.

(10) Patent No.: US 8,407,302 B2
(45) Date of Patent: Mar. 26, 2013

(54) MANAGING MEETING INVITATIONS TO SUB-INVITEES

(75) Inventors: Colm Farrell, Dublin (IE); Liam Harpur, Dublin (IE); Patrick J. O'Sullivan, Dublin (IE); Fred Raguillat, Meath (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/827,355

(22) Filed: Jun. 30, 2010

(65) Prior Publication Data

US 2012/0005728 A1    Jan. 5, 2012

(51) Int. Cl.
*G06F 15/16*    (2006.01)

(52) U.S. Cl. ........ 709/206; 709/204; 709/205; 709/217; 709/226; 709/227

(58) Field of Classification Search .......... 709/204–206, 709/217, 226–227
See application file for complete search history.

(56) References Cited

U.S. PATENT DOCUMENTS

| | | | |
|---|---|---|---|
| 4,817,018 A | 3/1989 | Cree et al. | |
| 4,977,520 A | 12/1990 | McGaughey, III et al. | |
| 5,093,901 A | 3/1992 | Cree et al. | |
| 5,129,057 A | 7/1992 | Strope et al. | |
| 5,352,155 A | 10/1994 | Fahey | |
| 5,960,406 A | 9/1999 | Rasansky et al. | |
| 6,085,166 A | 7/2000 | Beckhardt et al. | |
| 6,101,480 A | 8/2000 | Conmy et al. | |
| 6,363,352 B1 | 3/2002 | Dailey et al. | |
| 6,636,888 B1 | 10/2003 | Bookspan et al. | |
| 6,938,069 B1 * | 8/2005 | Narayanaswamy | 709/204 |
| 6,957,229 B1 | 10/2005 | Dyor | |
| 7,076,558 B1 | 7/2006 | Dunn | |
| 7,082,402 B2 | 7/2006 | Conmy et al. | |
| 7,519,924 B2 | 4/2009 | Bocking et al. | |
| 7,870,192 B2 * | 1/2011 | Greenlee et al. | 709/204 |
| 2004/0215497 A1 | 10/2004 | Leist | |
| 2004/0267938 A1 * | 12/2004 | Shoroff et al. | 709/227 |
| 2005/0034079 A1 | 2/2005 | Gunasekar et al. | |
| 2006/0200374 A1 | 9/2006 | Nelken | |
| 2007/0270125 A1 | 11/2007 | Pousti | |
| 2008/0040188 A1 | 2/2008 | Klausmeier | |
| 2008/0098313 A1 | 4/2008 | Pollack | |
| 2008/0177611 A1 | 7/2008 | Sommers et al. | |

* cited by examiner

*Primary Examiner* — Wing F Chan
*Assistant Examiner* — Benjamin M Thieu
(74) *Attorney, Agent, or Firm* — Law Office of Jim Boice

(57) ABSTRACT

A computer implemented method manages meeting invitations to sub-invitees. A meeting coordinating computer detects a meeting invitation being sent from a meeting moderator's computer to a primary invitee's computer. The meeting coordinating computer intercepts a response from the primary invitee's computer. This response contains a request for a sub-invitee to accompany the primary invitee to the meeting. If the sub-invitee is initially authorized by the meeting coordinating computer to attend the meeting, then a request is transmitted to the meeting moderator's computer for additional authorization to invite the sub-invitee to the meeting.

16 Claims, 5 Drawing Sheets

MANAGING MEETING INVITATIONS TO SUB-INVITEES

BACKGROUND

The present disclosure relates to the field of computers, and specifically to the use of computers to coordinate meetings. Still more particularly, the present disclosure relates to transmitting invitations to meetings.

Meetings are a staple of enterprise operations. Such meetings may be teleconferences (e.g., a web conferences, video conferences, phone calls, etc.) or face-to-face meetings in conference rooms, auditoriums, etc. An organizer of a meeting can propose a topic, time, date and location for the meeting in invitations that are sent to potential attendees.

BRIEF SUMMARY

In one embodiment of the present disclosure, a computer implemented method manages a meeting invitation to a sub-invitee. A meeting coordinating computer detects a meeting invitation being sent from a meeting moderator's computer to a primary invitee's computer. The meeting coordinating computer intercepts a response from the primary invitee's computer. This response contains a request for a sub-invitee to accompany the primary invitee to the meeting. If the sub-invitee is initially authorized by the meeting coordinating computer to attend the meeting, then a request is transmitted to the meeting moderator's computer for additional authorization to invite the sub-invitee to the meeting.

In one embodiment of the present disclosure, a computer system comprises: a central processing unit; and a memory coupled to the central processing unit, wherein the memory comprises software that, when executed, causes the central processing unit to implement: detecting a meeting invitation from a meeting moderator's computer to a primary invitee's computer, wherein the primary invitee's computer is utilized by a primary invitee; receiving a response from the primary invitee's computer, wherein the response comprises a request for a sub-invitee to accompany the primary invitee to the meeting; in response to initially determining that the sub-invitee is authorized to attend the meeting, transmitting the request to invite the sub-invitee to the meeting to the meeting moderator's computer; and in response to receiving additional authorization from the meeting moderator's computer to invite the sub-invitee to the meeting, transmitting the meeting invitation to a sub-invitee's computer that is utilized by the sub-invitee.

In one embodiment of the present disclosure, a computer program product comprises: a computer readable storage medium having computer readable program code embodied therewith, the computer readable program code comprising: computer readable program code to detect a meeting invitation from a meeting moderator's computer to a primary invitee's computer; computer readable program code to receive a response from the primary invitee's computer, wherein the response comprises a request for a sub-invitee to accompany the primary invitee to the meeting; computer readable program code to, in response to initially determining that the sub-invitee is authorized to attend the meeting, transmit the request to invite the sub-invitee to the meeting to the meeting moderator's computer; and computer readable program code to, in response to receiving an authorization from the meeting moderator's computer to invite the sub-invitee to the meeting, transmit the meeting invitation to a sub-invitee's computer that is utilized by the sub-invitee.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
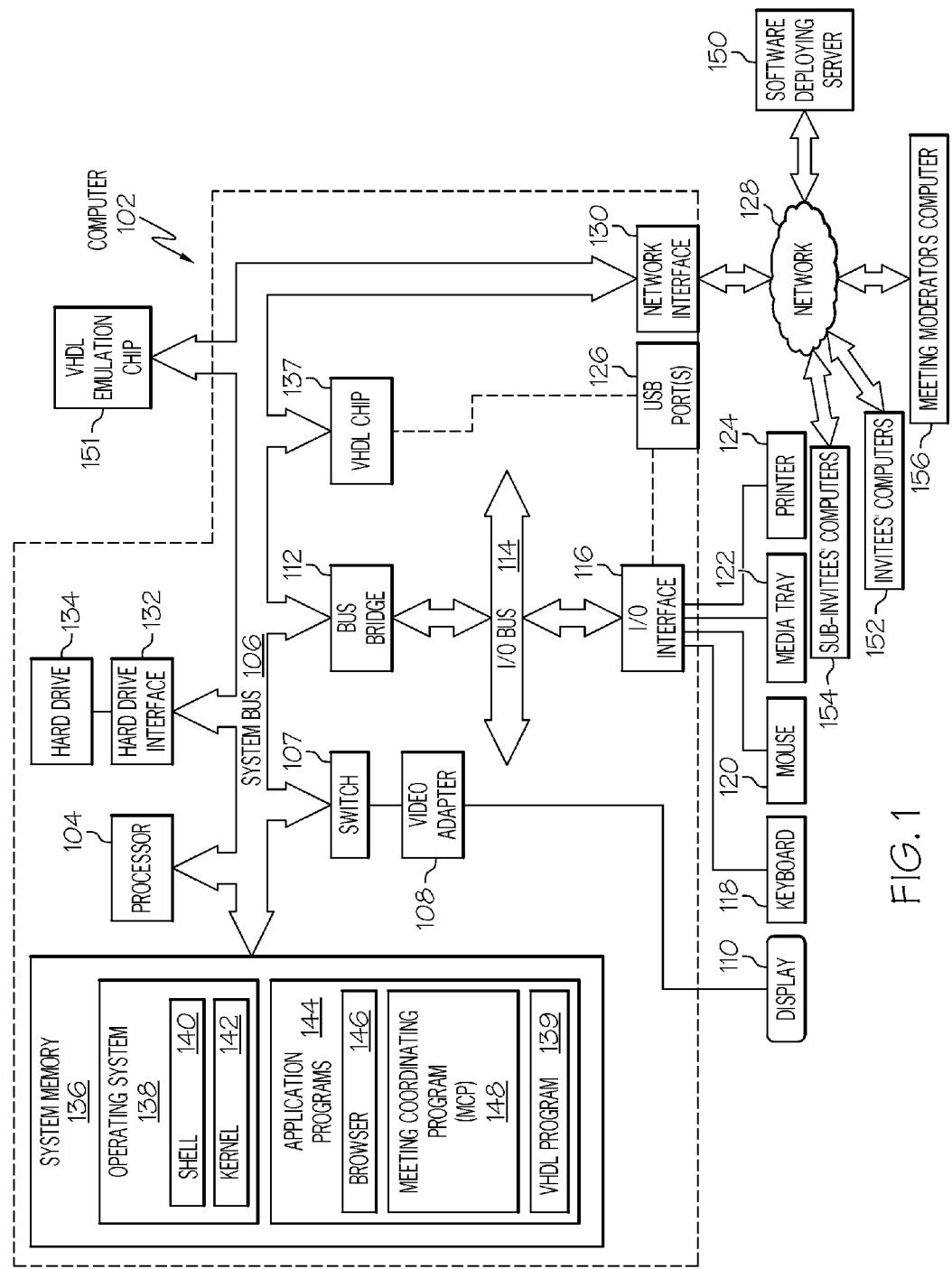
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, invitees' computers 152, sub-invitees' computers 154, and/or meeting moderator's computer 156.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., meeting coordinating program—MCP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, invitees' computers 152 and/or sub-invitees' computers 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a meeting coordinating program (MCP). MCP 148 includes code for implementing the processes described below, including those described in FIGS. 2-5. In one embodiment, computer 102 is able to download MCP 148 from software deploying server 150, including in an on-demand basis, such that the code from MCP 148 is not downloaded until runtime or otherwise immediately needed by computer 102. Note further that, in one embodiment of the present disclosure, software deploying server 150 performs all of the functions associated with the present disclosure (including execution of MCP 148), thus freeing computer 102 from having to use its own internal computing resources to execute MCP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from MCP 148 causes VHDL program 139 to configure VHDL chip 137, which may be an FPGA, ASIC, etc.

In another embodiment of the present disclosure, execution of instructions from MCP 148 results in a utilization of VHDL program 139 to program a VHDL emulation chip 151. VHDL emulation chip 151 may incorporate a similar architecture as described above for VHDL chip 137. Once MCP 148 and VHDL program 139 program VHDL emulation chip 151, VHDL emulation chip 151 performs, as hardware, some or all functions described by one or more executions of some or all of the instructions found in MCP 148. That is, the VHDL emulation chip 151 is a hardware emulation of some or all of the software instructions found in MCP 148. In one embodiment, VHDL emulation chip 151 is a programmable read only memory (PROM) that, once burned in accordance with instructions from MCP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
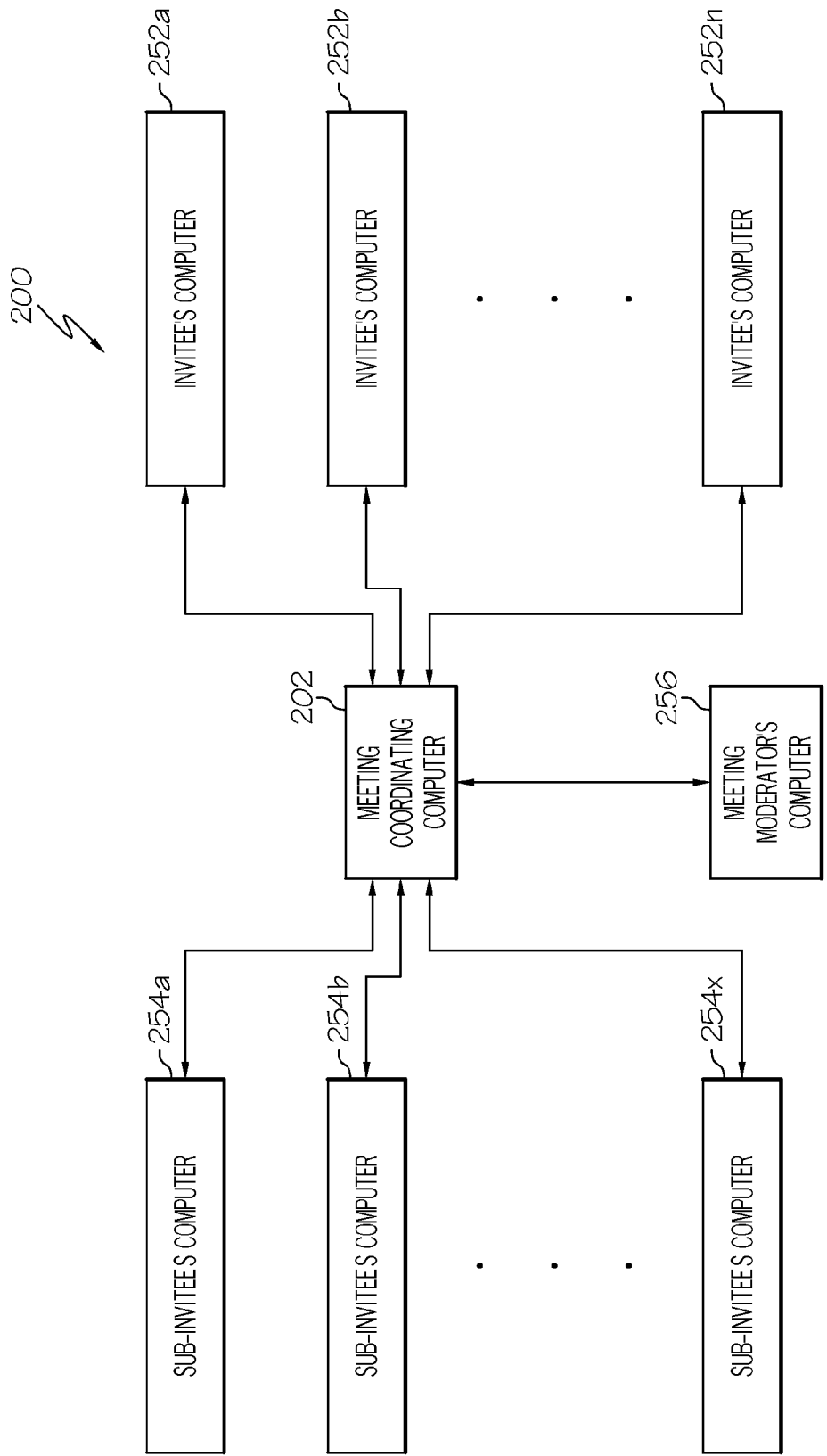
FIG. 2 illustrates an exemplary networked system in which a meeting coordinating computer controls the issuance of meeting invitations to sub-invitees.

With reference now to FIG. 2, an exemplary networked system 200 in which a meeting coordinator's computer 202 manages the issuance of meeting invitations to sub-invitees is presented. Note that elements 202, 252a-n (where "n" is an integer), 254a-x (where "x" is an integer), and 256 are equivalent to respective elements 102, 152, 154, and 156 depicted in FIG. 1. Meeting coordinator's computer 202 detects meeting invitations from meeting moderator's computer 256 to invitee's computers 252a-n, which are utilized by primary invitees to a meeting. The primary invitees are invitees to whom the invitations to the meeting are initially extended from a meeting moderator who utilizes the meeting moderator's computer 256. For example, the primary invitees may be those persons who are on an initial invitation list from the meeting moderator. The meeting may be a teleconference, a face-to-face meeting, a group meeting (e.g., in a conference room with all attendees in the same room), a chat session, a videoconference, etc. One or more of the invitees' computers 252a-n may respond with a message requesting that a sub-invitee, of a primary invitees' choosing, attend the meeting with the sub-invitee. The sub-invitee utilizes one of the sub-invitee's computers 254a-x depicted in FIG. 2. The response from the primary invitee (e.g., a user of one of the invitee's computers 252a-n) is intercepted by the meeting coordinating computer 202 for processing as described in detail below. In one embodiment, the sub-invitee holds a special relationship with the primary invitee (e.g., the sub-invitee is the primary invitee's attorney, main customer, etc.). In one embodiment, the sub-invitee has special expertise that the primary invitee believes is useful, if not critical, to the meeting.

Note that, in one embodiment of the present disclosure, the primary invitees (parties who initially received a meeting invitation from the meeting coordinator's computer 202) have no authority and/or ability to actually invite the sub-invitees to the meeting. Rather, in this embodiment the primary invitees can only request that the meeting coordinating computer 202, exercising known authorization rules and/or by receiving authorization from the meeting moderator, offer the sub-invitee an invitation to the meeting. However, in one embodiment, the authority of the meeting moderator to accept/reject sub-invitations can be conferred on the primary invitee. This authority transfer can be based on a trust relationship between the meeting moderator and the primary invitee (i.e., the meeting moderator has previously conferred the authority to the primary invitee), or the authority transfer can be based on the primary invitee "out-ranking" the meeting moderator. Thus, if the primary invitee holds a position or title that carries with it the authority to supersede actions taken by one holding the position/title of the meeting moderator, then the authority to alter the details of the business meeting can be conferred upon the primary invitee.

Note also that, in one embodiment of the present disclosure, the meeting coordinating computer 202 executes a process that is outside that used by the meeting moderator's computer 256. That is, in one embodiment, assume that meeting moderator's computer 256 is utilizing a calendar and/or e-mail process to extend invitations to the invitee's computers 252a-n. Meeting coordinating computer 202 utilizes a process that is outside of, and thus is not directly tied to, the calendar/e-mail program used by the meeting moderator's computer 256. Rather, in this embodiment the meeting coordinating computer 202 focuses on monitoring meeting invitations, determining whether the invitees are authorized, etc., as described herein. Meeting coordinating computer 202 does not, in this embodiment, actually create the invitations, set appointments in calendars, etc. Rather, the processes involved in creating invitations, reserving rooms, setting calendar appointment dates, etc. are performed by the meeting moderator's computer 256. This frees up meeting coordinator computer 202 to be able to monitor multiple meetings and/or meeting moderator's computers, beyond meeting moderator's computer 256, in a platform-independent and scalable manner.

Note that while meeting coordinating computer 202 is depicted as a stand-alone computer, in one embodiment meeting coordinating computer 202 is actually a process running on a computer cloud, a service oriented architecture (SOA), a multi-purpose server, etc. that include the capacity to function as a meeting server. In one embodiment, the processes attributed herein to the meeting coordinator computer 202 may actually be executed by multiple threads from a process, such that each thread is dedicated to handling invitations to sub-invitees from a specific primary invitee.

Note further that invitees and/or sub-invitees may be in different countries, time zones, etc. Thus, meeting coordinating computer 202, or logic/processes that perform the functions of meeting coordinating computer 202 as described herein, relieves the meeting moderator from the burden of monitoring who will attend the meeting. Furthermore, logic associated with meeting coordinating computer 202 (e.g., MCP 148 shown in FIG. 1) can utilize parameters pre-selected by the meeting moderator (or a trusted or superior invitee) to limit the total number of invitees/sub-invitees, send out updated invitations (in response to a change in the time, date, location and/or topic of the meeting), automatically reserve new room locations where necessary, automatically send notices to non-attending parties that have been pre-defined as needing to be notified of any such meetings, etc.

Figure 3:
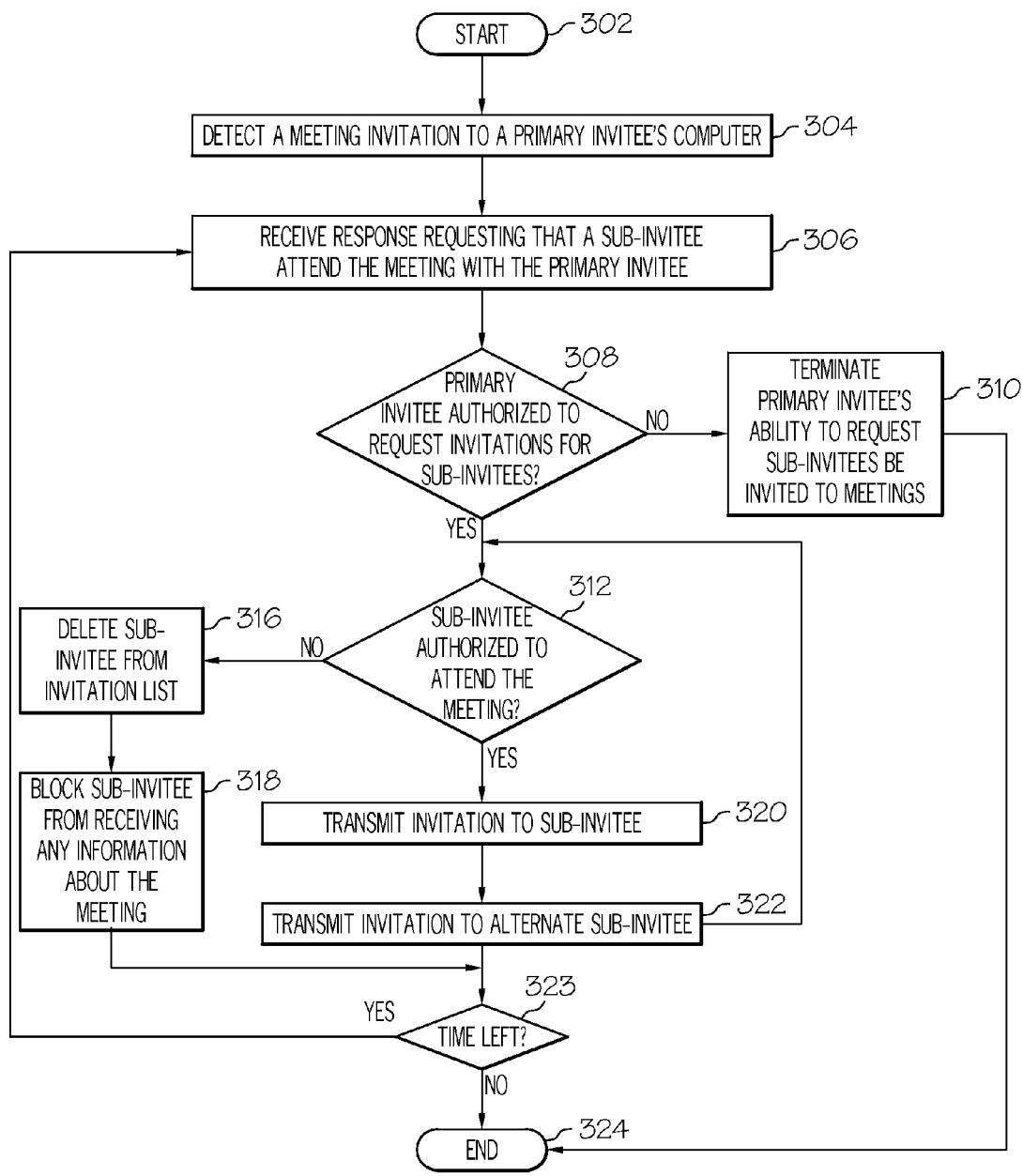
FIG. 3 is a high level flow chart of one or more exemplary steps performed by a computer to manage meeting invitations to sub-invitees.

With reference now to FIG. 3, a high level flow chart of one or more exemplary steps performed by a computer to manage meeting invitations to sub-invitees is presented. After initiator block 302, a meeting coordinating computer detects an invitation to a meeting from a meeting moderator's computer to a primary invitee's computer (block 304). As described in block 306, a response is received from the primary invitee (e.g., the response is intercepted by a meeting coordinator computer). The response comprises a request for a sub-invitee, who is selected by the primary invitee, to accompany the primary invitee to the meeting. In one embodiment, this results in a warning message being transmitted to the sub-invitee, letting the sub-invitee know that the primary invitee has recommended that the sub-invitee attend the meeting.

Figure 4:
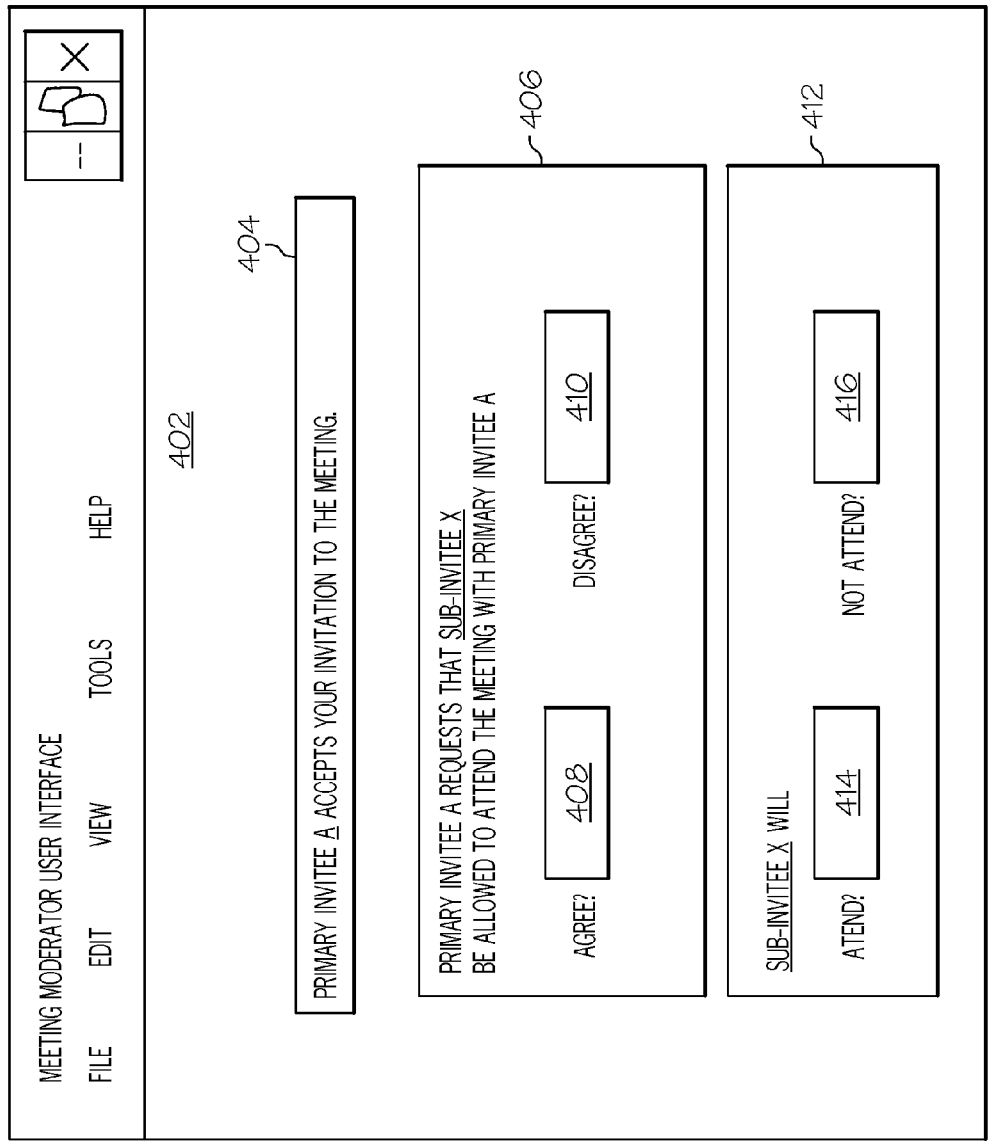
FIG. 4 is an exemplary user interface presented to a meeting moderator.

In one embodiment, the response from the primary invitee results in a presentation of a user interface (UI), such as UI 402 depicted in FIG. 4, from the meeting coordinator's computer to the meeting moderator's computer. Note that UI 402 includes an acceptance window 404 indicating that the primary invitee has accepted the invitation to the meeting. In addition, UI 402 includes a request window 406. Request window 406 indicates the name of a sub-invitee that the primary invitee wants to accompany the primary invitee to the meeting. If the meeting coordinator agrees, he can click button 408, which results in an invitation to the meeting being automatically sent to the named sub-invitee ("Sub-invitee X"). If the meeting coordinator does not agree to invite the proposed sub-invitee, then he can click button 410, resulting in the sub-invitee being removed from a proposed invitation list, blocking the sub-invitee from receiving any information about the meeting, offering the sub-invitee the opportunity to attend a different meeting, etc.

Returning now to FIG. 3, and specifically to query block 308, if the primary invitee did not have the authority to recommend or request that a sub-invitee attend the meeting, then, in order to avoid future problems from unauthorized parties requesting sub-invitations, that primary invitee is permanently blocked from requesting that a sub-invitee be invited to a meeting (block 310). This action can be performed by the meeting coordinating computer 202, shown in FIG. 2, transmitting an executable packet to the unauthorized invitee's computer (from elements 252*a-n*) to prevent that invitee from making such a request in the future.

Note that in one embodiment, the meeting moderator and/or meeting coordinating computer authorize the primary invitee with a certain number of sub-invitee invitation suggestions. For example, a certain primary invitee, based on his position, title, involvement with a particular project related to the meeting, etc., may be given carte blanche to invite as many sub-invitees to the meeting as he desires. Another primary invitee, based on these and/or similar criteria, may be authorized to suggest no sub-invitees to the meeting. Similarly, another primary invitee may be authorized to suggest less than a certain number (e.g., 3) sub-invitees to the meeting.

As depicted in query block 312, a determination is made as to whether the sub-invitee is authorized to attend the meeting. This determination is initially made by the meeting coordinator computer 202 shown in FIG. 2. This initial determination (initial authorization for the sub-invitee to attend the meeting) is made based on the sub-invitee's identity, role, relationship to invitees, relationship to the topic of the meeting, etc., as described herein. For example, a particular sub-invitee's name may be on a list of persons who are unauthorized to attend the meeting currently being scheduled, or that particular sub-invitee may be unauthorized to attend any meetings related to a particular topic, having certain (e.g., high profile) attendees, etc. In one embodiment, additional authorization is required from the meeting moderator in order to invite the sub-invitee. That is, the meeting coordinator computer 202 re-transmits the request from the primary invitee to the meeting moderator's computer 256 shown in FIG. 2. If the meeting moderator agrees to allow the sub-invitee into the meeting, then this additional authorization (e.g., created by clicking button 408 in FIG. 4) is sent to the meeting coordinator computer 202.

In one embodiment, the additional authorization is based on the whim of the meeting moderator.

In one embodiment, the initial and/or additional authorization is based on the meeting coordinator's computer, upon receiving directives from the meeting moderator or by another primary invitee whose authority for coordinating the meeting matches or exceeds that of the meeting moderator, executing a rule for making such determinations. For example, in one embodiment the sub-invitee may be deemed unauthorized by a rule simply because the meeting coordinating computer has determined that the sub-invitee has a scheduling conflict. In another embodiment, a rule may deem the proposed sub-invitee to be unauthorized because of a known conflict of interest. In one embodiment, a rule may state that only members of a specific enterprise department are deemed authorized to be a sub-invitee. In one embodiment, a rule may state that only primary invitees holding positions above a minimum level in an enterprise organization chart may request sub-invitees, such that lower-ranked primary invitees' recommendations result in their recommended sub-invitees being unauthorized, such that no invitation is extended to those recommended sub-invitees. In one embodiment, a rule may state that parties that are not allowed to meet with other primary invitees (e.g., due to security issues, project divisions, barriers set up to avoid conflict of interests, confidentiality issues, etc.) are deemed unauthorized to be sub-invitees. Similarly, parties that are not allowed to access information that will be presented in the meeting are deemed to be unauthorized, and any invitation to the meeting that may have been issued is withdrawn.

As depicted in block 316, in one embodiment of the present disclosure the unauthorized sub-invitee is deleted from any pending invitation list that may exist, and may be blocked from receiving any information about the meeting, at least until that rejected sub-invitee has been determined to be authorized to attend the meeting (block 318). In one embodiment, blocking information about the meeting is performed by the meeting coordinating computer 202 rerouting some or all electronic message traffic, which is addressed to that rejected sub-invitee's computer, through the meeting coordinator's computer 202 for content evaluation. Any information about the meeting will be blocked until the proposed sub-invitee is deemed authorized and/or invited to the meeting.

As depicted in block 320, once the sub-invitee has been deemed authorized to attend the meeting, then an invitation to the meeting is transmitted to the sub-invitees' computer (e.g., one of sub-invitees' computers 254*a-x* shown in FIG. 2). Note that if a previously invited sub-invitee is determined by the meeting coordinating computer to be unavailable to attend the meeting, then that invitation is withdrawn by the meeting coordinating computer. In one embodiment, a message is addressed to the meeting moderator indicating whether the sub-invitee does or does not agree to attend the meeting. For example, the UI 402 shown in FIG. 4 may include a block 412, indicating whether Sub-invitee X will attend (box 414) or not (box 416). If the sub-invitee declines the invitation, then logic within the meeting coordinating computer will invite another sub-invitee, if one is on a list of authorized sub-invitees (block 322). That is, if the sub-invitee declines the invitation, then logic within the meeting coordinating computer will motivate an alternate invitation for another sub-invitee, by alerting the primary invitee that the originally named sub-invitee has declined the invitation. This provides the meeting coordinating computer with the ability to nominate an alternate sub-invitee, assuming that the alternate sub-invitee is on the list of authorized sub-invitees. At this point, the sub-invitee may accept or decline the invitation (e.g., see elements 412, 414, and 416 in FIG. 4). In one embodiment, the meeting coordinating computer will process the sub-invitee's response on behalf of the primary invitee and/or the meeting moderator.

As depicted in query block 323, there may be a time at which the meeting moderator and/or the process/logic associated with the meeting coordinator computer elects to close the process. That is, after this point in time, no additional invitees/sub-invitees may be invited to the meeting, no changes to the topic of the meeting may be made, no changes to the time and location for the meeting may be made, etc. If this point in time has been reached, then the process ends at terminator block 324.

Figure 5:
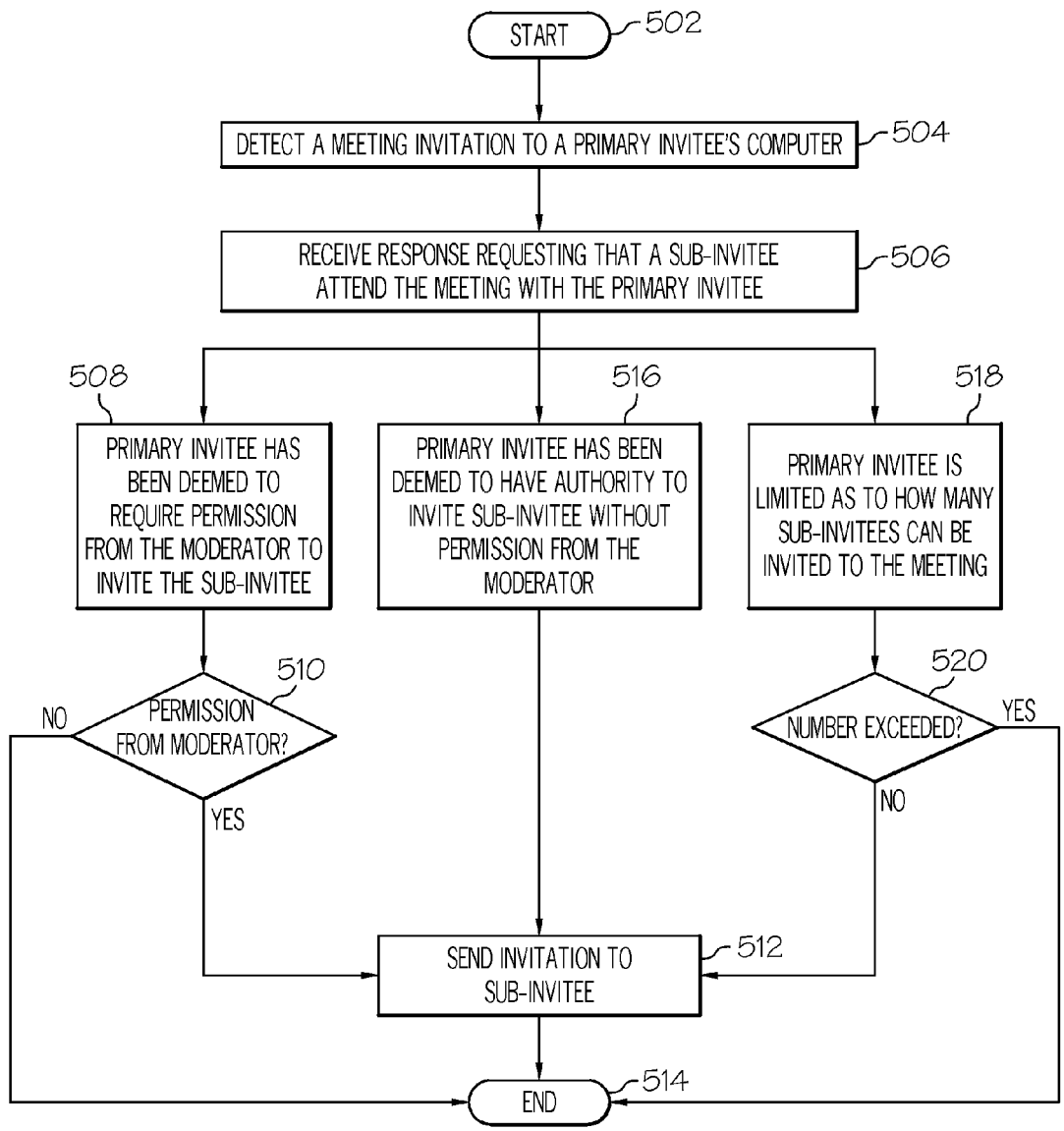
FIG. 5 is a high level flow chart depicting different scenarios for inviting sub-invitees to a meeting.

With reference now to FIG. 5, various scenarios encountered by a meeting coordinating computer when invitations to sub-invitees to a meeting are presented. After initiator block 502, a meeting invitation to a primary invitee's computer is detected by a process logic, such as that described herein for meeting coordinating computer 202 shown in FIG. 2. The meeting coordinating computer then detects/receives/intercepts a request from a primary invitee to invite a sub-invitee to the meeting (block 506).

In one embodiment of the present disclosure, the primary invitee must have permission from the meeting moderator and/or the meeting coordinating computer before the invitation is sent to the named sub-invitee (block 508). If so, then permission to invite the sub-invitee must come from the moderator and/or the meeting coordinating computer (query block 510) before the invitation is extended to the sub-invitee (block 512). The process thus ends at terminator block 514.

In one embodiment of the present disclosure, the primary invitee has been deemed to have authority to invite whomever he desires (block 516). This authority may be derived from the position/title that the primary invitee holds, which is higher than that held by the moderator of the meeting. In one embodiment, the authority to invite whomever he desires is based on trust relationship between the meeting moderator and the primary invitee. This trust relationship is specified in logic within the meeting coordinating computer, such that the invitation is extended to the sub-invitee without any additional authorization from the moderator (block 512).

In one embodiment of the present disclosure, where the primary invitee has authority to invite sub-invitees with or without the further approval of the moderator, the primary invitee has a certain number of sub-invitees that he is authorized to invite (block 518). In one embodiment, this number is unlimited. Thus, in this embodiment, the number of sub-invitees presented by the primary invitee is never exceeded (query block 520), and any authorized sub-invitees receive their invitations (block 512). In another embodiment, this number is zero (query block 520). In this case, the primary invitee is therefore not authorized to invite any sub-invitees, and the process ends without an invitation being extended to the named sub-invitee (terminator block 514). In another embodiment, this number is some finite number. This finite number can be based on the available resources, space, etc. of the meeting; the position/title held by the primary invitee; etc. Assume for exemplary purposes that this finite number is 5. If the primary invitee has already invited 5 sub-invitees (query block 520), then an invitation will not be extended to any more sub-invitees requested by that primary invitee (terminator block 514). However, if that primary invitee has not exceeded hit quota (i.e., has only invited 3 sub-invitees so far), then an invitation will be extended to this next named sub-invitee (block 512), assuming that this next named sub-invitee is authorized to attend the meeting.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method to manage a meeting invitation to a sub-invitee, the computer implemented method comprising:

a meeting coordinating computer detecting a meeting invitation, for a meeting, sent from a meeting moderator's computer to a primary invitee's computer, wherein the primary invitee's computer is utilized by a primary invitee to the meeting;

the meeting coordinating computer intercepting a response from the primary invitee's computer, wherein the response comprises a request for a sub-invitee to accompany the primary invitee to the meeting;

in response to the meeting coordinating computer initially determining that the sub-invitee is authorized to attend the meeting, the meeting coordinating computer transmitting the request to the meeting moderator's computer;

in response to the meeting coordinating computer receiving additional authorization from the meeting moderator's computer to invite the sub-invitee to the meeting, the meeting coordinating computer transmitting the meeting invitation to a sub-invitee's computer that is utilized by the sub-invitee, wherein the additional authorization is provided by another primary invitee whose authority for coordinating the meeting matches that of a moderator of the meeting;

the meeting coordinating computer establishing a minimum level within an enterprise organization chart for issuing meeting invitations; and the meeting coordinating computer permitting only primary invitees holding positions above the minimum level within the enterprise organization chart to recommend sub-invitees to the meeting.

2. The computer implemented method of claim 1, further comprising:

in response to determining that the primary invitee has a trust relationship with a meeting moderator authorizing the primary invitee to determine which parties attend the meeting, the meeting coordinating computer transmitting the meeting invitation to the sub-invitee's computer without the additional authorization from the meeting moderator's computer.

3. The computer implemented method of claim 1, further comprising:
the meeting coordinating computer transmitting a warning message to the sub-invitee, wherein the warning message conveys that the primary invitee has recommended that the sub-invitee attend the meeting.

4. The computer implemented method of claim 1, wherein the primary invitee is assigned to a specific enterprise department, and wherein the computer implemented method further comprises:
the meeting coordinating computer permitting only a member of the specific enterprise department to be named as the sub-invitee to the meeting.

5. The computer implemented method of claim 1, further comprising:
the meeting coordinating computer limiting how many sub-invitees that the primary invitee can recommend attend the meeting.

6. The computer implemented method of claim 1, wherein the meeting is a teleconference.

7. The computer implemented method of claim 1, wherein the meeting is a face-to-face meeting.

8. The computer implemented method of claim 1, further comprising:
the meeting coordinating computer determining that the primary invitee has authority over the meeting that matches a meeting moderator of the meeting;
the meeting coordinator computer transmitting the meeting invitation to the sub-invitee on behalf of the primary invitee and the meeting moderator; and
the meeting coordinator computer processing a response to the meeting invitation from the sub-invitee on behalf of the primary invitee and the meeting moderator.

9. The computer implemented method of claim 1, further comprising:
the meeting coordinating computer blocking any electronic messages, which are related to the meeting, to the sub-invitee until the sub-invitee has been determined to be authorized to attend the meeting.

10. A computer system comprising:
a central processing unit; and
a memory coupled to the central processing unit, wherein the memory comprises software that, when executed, causes the central processing unit to implement:
detecting a meeting invitation, for a meeting, from a meeting moderator's computer to a primary invitee's computer, wherein the primary invitee's computer is utilized by a primary invitee;
receiving a response from the primary invitee's computer, wherein the response comprises a request for a sub-invitee to accompany the primary invitee to the meeting;
in response to initially determining that the sub-invitee is authorized to attend the meeting, transmitting the request to the meeting moderator's computer;
in response to receiving additional authorization from the meeting moderator's computer to invite the sub-invitee to the meeting, transmitting the meeting invitation to a sub-invitee's computer that is utilized by the sub-invitee, wherein the additional authorization is provided by another primary invitee whose authority for coordinating the meeting matches that of a moderator of the meeting;
establishing a minimum level within an enterprise organization chart for issuing meeting invitations; and
permitting only primary invitees holding positions above the minimum level within the enterprise organization chart to recommend sub-invitees to the meeting.

11. The computer system of claim 10, wherein the software, when executed, further causes the central processing unit to implement:
in response to determining that the primary invitee has a trust relationship with a meeting moderator authorizing the primary invitee to determine which parties attend the meeting, transmitting the meeting invitation to the sub-invitee's computer without the additional authorization from the meeting moderator's computer.

12. The computer system of claim 10, wherein the meeting is a teleconference.

13. A computer program product comprising:
a non-transitory computer readable storage medium having computer readable program code embodied therewith, the computer readable program code comprising:
computer readable program code to detect a meeting invitation, for a meeting, from a meeting moderator's computer to a primary invitee's computer, wherein the primary invitee's computer is utilized by a primary invitee;
computer readable program code to receive a response from the primary invitee's computer, wherein the response comprises a request for a sub-invitee to accompany the primary invitee to the meeting;
computer readable program code to, in response to initially determining that the sub-invitee is authorized to attend the meeting, transmit the request to the meeting moderator's computer;
computer readable program code to, in response to receiving additional authorization from the meeting moderator's computer to invite the sub-invitee to the meeting, transmit the meeting invitation to a sub-invitee's computer that is utilized by the sub-invitee, wherein the additional authorization is provided by another primary invitee whose authority for coordinating the meeting matches that of a moderator of the meeting;
computer readable program code to establish a minimum level within an enterprise organization chart for issuing meeting invitations; and
computer readable program code to permit only primary invitees holding positions above the minimum level within the enterprise organization chart to recommend sub-invitees to the meeting.

14. The computer program product of claim 13, wherein the computer readable program code further comprises:
computer readable program code to block any electronic messages, which are related to the meeting, to the sub-invitee until the sub-invitee has been determined to be authorized to attend the meeting.

15. The computer program product of claim 13, wherein the computer readable program code further comprises:
computer readable program code to, in response to determining that the primary invitee has a trust relationship with a meeting moderator authorizing the primary invitee to determine which parties attend the meeting, transmit the meeting invitation without the additional authorization from the meeting moderator's computer.

16. The computer program product of claim 13, wherein the computer readable program code further comprises:
computer readable program code to transmit a warning message to the sub-invitee, wherein the warning message conveys that the primary invitee has recommended that the sub-invitee attend the meeting.

* * * * *